US009437064B1

(12) United States Patent
Ghabra

(10) Patent No.: US 9,437,064 B1
(45) Date of Patent: Sep. 6, 2016

(54) METHOD FOR EXTENDING COMMUNICATION RANGE OF REMOTE CONTROL SYSTEM DURING WALKAWAY LOCKING CONTROL FUNCTION

(71) Applicant: Lear Corporation, Southfield, MI (US)

(72) Inventor: Riad Ghabra, Northville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/748,627

(22) Filed: Jun. 24, 2015

(51) Int. Cl.

| | |
|---|---|
| ***G05B 19/00*** | (2006.01) |
| ***B60R 25/00*** | (2013.01) |
| ***G05B 23/00*** | (2006.01) |
| ***G08C 19/12*** | (2006.01) |
| ***G07C 9/00*** | (2006.01) |

(52) U.S. Cl.
CPC ....... *G07C 9/00309* (2013.01); *G07C 9/00571* (2013.01); *G07C 9/00658* (2013.01); *G07C 2009/00317* (2013.01); *G07C 2009/00984* (2013.01)

(58) Field of Classification Search
CPC ........ G05B 19/00; G05B 23/00; B60R 25/00
USPC ........... 340/5.2, 5.72, 5.61; 455/234.1, 245.1
See application file for complete search history.

(56) References Cited

U.S. PATENT DOCUMENTS 4,942,393 A 7/1990 Waraksa et al.
5,379,033 A * 1/1995 Fujii .................. G07C 9/00182 340/12.22
5,600,323 A * 2/1997 Boschini ............ G07C 9/00182 340/12.5
5,973,611 A * 10/1999 Kulha ................... B60R 25/245 307/10.1
6,593,856 B1 * 7/2003 Madau ............... G05B 19/0428 340/12.27
6,778,065 B1 * 8/2004 Asakura ................ B60R 25/245 340/12.5
7,397,344 B2 7/2008 Nantz et al.
7,609,146 B2 10/2009 Tang et al.
7,650,127 B2 1/2010 Baumgartner et al.
7,868,735 B2 * 1/2011 Nakashima ......... B60R 25/2036 340/426.28
8,203,424 B2 6/2012 Ghabra et al.
8,531,269 B2 * 9/2013 Nagao ..................... B60R 25/00 340/426.16
2005/0237160 A1 10/2005 Nolan et al.
2007/0162191 A1 * 7/2007 Matsubara ......... G07C 9/00309 701/1
2007/0216517 A1 * 9/2007 Kurpinski ............ B60R 25/245 340/5.72
2008/0061929 A1 * 3/2008 Cromer ................... G06F 21/88 340/5.61
2011/0218709 A1 * 9/2011 Hermann ................ B60R 25/20 701/45
2012/0092129 A1 * 4/2012 Lickfelt .................. B60R 25/24 340/5.72

* cited by examiner

*Primary Examiner* — Nam V Nguyen
(74) *Attorney, Agent, or Firm* — Brooks Kushman P.C.

(57) ABSTRACT

A method for extending a communication range of a remote control system during a walkaway locking control function includes increasing a reception gain level of a portable controller of the remote control system to a high gain level. The high gain level provides an extended communication range in which the controller receives polling signals from a base station of the remote control system. The controller is unable to receive the polling signals while the controller is outside of the extended communication range. Upon the controller not receiving the polling signals, the controller transmits a command signal for receipt by the base station and decreases the reception gain level back to a normal gain level.

17 Claims, 4 Drawing Sheets

METHOD FOR EXTENDING COMMUNICATION RANGE OF REMOTE CONTROL SYSTEM DURING WALKAWAY LOCKING CONTROL FUNCTION

TECHNICAL FIELD

The present disclosure relates to remote control systems including passive entry passive start (PEPS) systems.

BACKGROUND

Passive entry passive start (PEPS) systems include a base station and a portable remote controller. The base station is at a target device such as a vehicle. The remote controller is carried by a user. The base station and the remote controller wirelessly communicate with one another for remote control of the target device.

SUMMARY

A method includes increasing a reception gain level of a portable controller to a high gain level providing an extended communication range in which the controller receives polling signals from a base station. The controller is unable to receive the polling signals while the controller is outside of the extended communication range. The method further includes, upon the controller not receiving the polling signals, transmitting a command signal from the controller for receipt by the base station and decreasing the reception gain level back to a normal gain level.

The method may further include transmitting a gain command signal from the base station and increasing the reception gain level of the controller to the high gain level in response to the controller receiving the gain command signal.

Increasing the reception gain level of the controller to the high gain level may occur in response to the controller being unable to receive the polling signals from the base station upon the controller being moved outside of a normal communication range provided by the normal gain level.

The command signal may be a lock command signal for a target device. The method may further include locking the target device by the base station in response to the base station receiving the lock command signal.

The reception gain level of the controller may be increased to the high gain level and decreased back to the normal gain level during a walkaway locking remote control function.

The polling signals may be low-frequency (LF) polling signals and the command signal may be an ultra-high frequency (UHF) signal. In this case, the extended communication range is a LF communication range.

A method for a remote control system including a base station at a target device (such as a vehicle) and a portable controller includes detecting, by the base station, the controller being moved out from the target device. The method further includes transmitting polling signals from the base station in response to the controller being moved out from the target device. The method further includes increasing a reception gain level of the controller from a normal gain level providing a normal communication range for the controller to receive the polling signals to a high gain level providing an extended communication range for the controller to receive the polling signals. The controller is unable to receive the polling signals while the controller has the normal gain level and is outside of the normal communication range. The controller is unable to receive the polling signals while the controller has the high gain level and is outside of the extended communication range. The method further includes transmitting a lock command signal from the controller and decreasing the reception gain level from the high gain level back to the normal gain level upon the controller not receiving the polling signals. The method further includes locking, by the base station, the target device in response to the base station receiving the lock command signal.

The method may further include transmitting a gain command signal from the base station in response to the controller being moved out from the target device and increasing the reception gain level of the controller from the normal gain level to the high gain level in response to the controller receiving the gain command signal.

Increasing the reception gain level of the controller to the high gain level may occur in response to the controller being unable to receive the polling signals from the base station upon the controller being moved outside of the normal communication range provided by the normal gain level.

A remote control system includes a base station at a target device (such as a vehicle) and a portable controller (such as a key fob). The base station is configured to detect the controller being moved out from the target device and to transmit polling signals in response to the controller being moved out from the target device. The controller is configured to increase a reception gain level of the controller from a normal gain level providing a normal communication range for the controller to receive the polling signals to a high gain level providing an extended communication range for the controller to receive the polling signals. The controller is unable to receive the polling signals while the controller has the normal gain level and is outside of the normal communication range. The controller is unable to receive the polling signals while the controller has the high gain level and is outside of the extended communication range. The controller is further configured to transmit a lock command signal and decrease the reception gain level from the high gain level back to the normal gain level upon the controller not receiving the polling signals. The base station is configured to lock the target device in response to receiving the lock command signal.

The base station may be further configured to transmit a gain command signal in response to the controller being moved out from the target device and the controller may be further configured to increase the reception gain level of the controller from the normal gain level to the high gain level in response to receiving the gain command signal.

The controller may be further configured to increase the reception gain level of the controller to the high gain level in response to the controller being unable to receive the polling signals from the base station upon the controller being moved outside of the normal communication range provided by the normal gain level.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
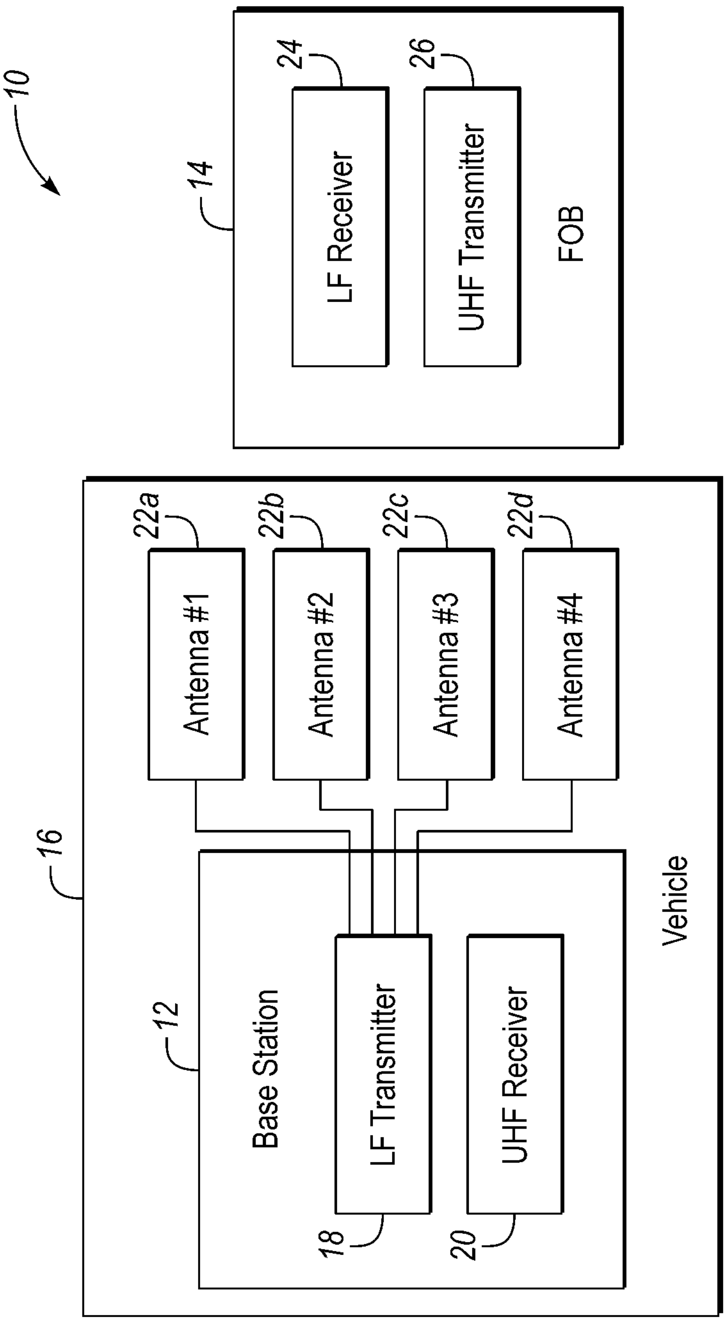
FIG. 1 illustrates a block diagram of a remote control system having a base station at a target device in the form of a vehicle and a portable remote controller in the form of a key fob ("fob")

Referring now to FIG. 1, a block diagram of a remote control system 10 is shown. Remote control system 10 includes a base station 12 and a portable remote controller 14. Base station 12 is at a target device such as a vehicle 16. Alternatively, the target device is a house, a garage, a gate, a building, a door, a lighting system, or the like. Base station 12 is configured to be able to control functions of vehicle 16. Base station 12 and remote controller 14 are operable for wirelessly transmitting/receiving signals to/from one another to enable the remote controller to remotely control vehicle 16 via the base station.

Remote control system 10 is configured to perform passive entry passive start (PEPS) functions. PEPS capability enables remote controller 14 to remotely control vehicle 16 automatically (or "passively") without user actuation of the remote controller. As an example of a passive entry function, base station 12 unlocks a vehicle door in response to the remote controller 14 being brought into the vicinity of vehicle 16. As an example of a passive start function, base station 12 starts vehicle 16 upon a user in possession of remote controller 14 pressing a start button on the vehicle dashboard.

Remote control system 10 may be further configured to perform remote keyless entry (RKE) functions. RKE capability enables remote controller 14 to remotely control vehicle 16 in response to user actuation of buttons or the like of the remote control unit. As an example of a RKE function, base station 12 unlocks a vehicle door in response to receiving a vehicle door unlock command from remote controller 14. Remote controller 14 transmits the vehicle door unlock command to base station 12 in response to corresponding user actuation of the remote controller.

Remote controller 14 is a portable device to be carried by a user. For instance, remote controller 14 is a key fob ("fob"). However, remote controller 14 could be a smart phone, a tablet, a wearable device such as a smart watch, or the like.

As shown in FIG. 1, base station 12 includes a low-frequency (LF) transmitter 18 and an ultra-high frequency (UHF) receiver 20. LF transmitter 18 is associated with one or more LF antennas such as antennas *22**a*, *22**b*, *22**c*, and *22**d*. Antennas *22**a*, *22**b*, *22**c*, *22**d* are positioned at respective locations of vehicle 16 (e.g., center console, right vehicle door, left vehicle door, trunk). LF transmitter 18 is operable for transmitting LF signals via antennas *22**a*, *22**b*, *22**c*, and *22**d* to fob 14. UHF receiver 20 is operable for receiving UHF signals from fob 14.

As further shown in FIG. 1, fob 14 includes a LF receiver 24 and an UHF transmitter 26. LF receiver 24 is operable for receiving LF signals from base station 12. UHF transmitter 26 is operable for transmitting UHF signals to base station 12.

As examples, the LF operating frequency range is between 20 to 300 kHz and the UHF operating frequency range is between 300 MHz to 3 GHz including a 300 MHz to 1 GHz operating range.

As indicated, remote control system 10 is configured to perform passive (e.g., PEPS) control functions such that fob 14 can remotely control vehicle 16 automatically without user actuation of the fob. In this regard, remote control system 10 may provide passive entry, passive unlock, and passive lock control functions. Base station 12 enables these control functions to occur upon the base station detecting: (i) user intention of the corresponding control function, (ii) fob 14 being within the vicinity of vehicle 16 (i.e., the fob being within the vicinity of the base station), and (iii) the fob being authorized (or authenticated) to control the vehicle. For example, assuming fob 14 is authorized, base station 12 enables these control functions in response to the user touching door handle, pressing unlock/lock button, etc., while the fob is in user possession. Remote control system 10 may further provide an approach unlocking control function.

Remote control system 10 provides a walkaway locking control function. The walkaway locking control function occurs when a user carrying fob 14 exits vehicle 16 and walks away from the vehicle. Base station 12 locks vehicle 16 upon the user walking far away from the vehicle. That is, base station 12 locks vehicle 16 upon fob 14 being moved far away from the vehicle. Correspondingly, base station 12 does not lock vehicle 16 while the user with fob 14 is near vehicle 16.

Figure 2B:
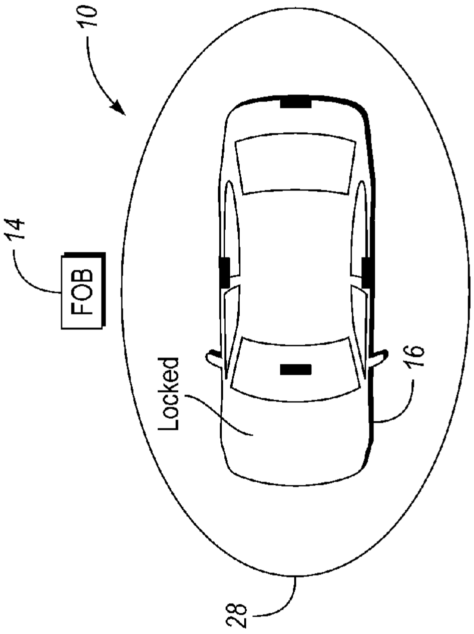
FIG. 2B illustrates a schematic of the fob located away from the vehicle at a second position, the second position being outside of the normal communication range.
Figure 2A:
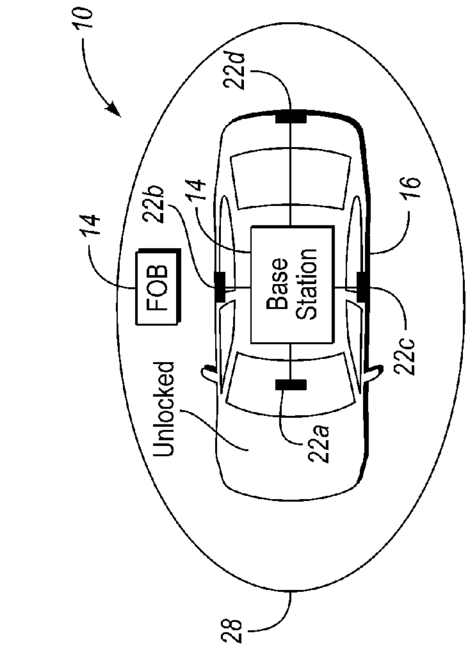
FIG. 2A illustrates a schematic of the fob located away from the vehicle at a first position, the first position being within a normal communication range of the remote control system.

Referring now to FIGS. 2A and 2B, with continual reference to FIG. 1, the walkaway locking control function will be described in greater detail. FIG. 2A illustrates a schematic of fob 14 located away from vehicle 16 at a first position. As depicted in FIG. 2A, the first position in within a normal communication range 28 of remote control system 10. FIG. 2B illustrates a schematic of fob 14 located away from vehicle 16 at a second position. As depicted in FIG. 2B, the second position is outside of normal communication range 28.

Normal communication range 28 defines a boundary between the user with fob 14 being near or far from vehicle 16 during the walkaway locking control function. Fob 14 is considered to be near vehicle 16 when the fob is located within normal communication range 28. In this case, base station 12 does not lock vehicle 16 and the vehicle remains unlocked (the user with the fob having already exited the vehicle). For instance, base station 12 does not lock vehicle 16 while fob 14 is at the first position within normal communication range 28 as shown in FIG. 2A. Fob 14 is considered to be far from vehicle 16 when the fob is located outside of normal communication range 28. In this case, base station 12 locks vehicle 16 upon fob 14 being moved outside of normal communication range 28. For instance, base station 12 locks vehicle 16 while fob 14 is at the second position outside of normal communication range 28 as shown in FIG. 2B.

Normal communication range 28 is the communication range at which fob 14 is able to receive LF communications from base station 12. When fob 14 is within normal communication range 28, LF receiver 24 of the fob can detect LF signals transmitted from LF transmitter 18 of base station 12. Correspondingly, when fob 14 is outside of normal communication range 28, LF receiver 24 of the fob cannot detect LF signals transmitted from LF transmitter 18 of base station 12.

The operation of the walkaway locking control function includes base station 12 locking vehicle 16 upon receiving a lock command from fob 14 and the fob transmitting the lock command upon the fob being moved outside of normal communication range 28. Base station 12 does not lock vehicle 16 until the lock command from fob 14 is received. LF transmitter 18 of base station 12 continually transmits LF polling signals upon the base station detecting (i) the user exiting vehicle 16 and (ii) fob 14 being outside of the vehicle. LF receiver 24 of fob 14 receives the LF polling signals while the fob is within normal communication range 28. Once fob 14 moves outside of normal communication range 28, LF receiver 24 of the fob is unable to receive the LF polling signals as the LF receiver of the fob and antennas 22*a*, 22*b*, 22*c*, 22*d* of LF transmitter 18 of base station 12 are too far from one another. Fob 14 transmits the lock command (via its UHF transmitter 26) as soon as LF receiver 24 of the fob stops receiving the LF polling signals. Accordingly, fob 14 transmits the lock command upon the fob being moved outside of normal communication range 28. Base station 12 responds to receiving the lock command (via its UHF receiver 20) by locking vehicle 16 and terminating transmission of the LF polling signals. Fob 14 goes into a standby (or sleep) mode after transmitting the lock command.

As described, normal communication range 28 is an LF communication range in which LF communication between base station 12 and fob 14 can take place. Normal communication range 28 is a function of several parameters including: size/placement of the base station LF antennas (i.e., antennas 22*a*, 22*b*, 22*c*, and 22*d*); electrical current provided to the base station LF antennas; size of the fob LF antenna; electrical current provided to the fob LF antenna; gain of LF receiver 24 of the fob; and other factors.

The gain of LF receiver 24 of fob 14 is selectable from several gain values. Fob 14 includes a micro-controller which can be used to set the gain of LF receiver 24 of fob 14 at the time of manufacturing remote control system 10 or any time during the lifetime operation of the remote control system. A higher gain of LF receiver 24 of fob 14 leads to a larger size normal communication range 28, with all other factors being maintained. Higher gain settings consume more battery power of fob 14 leading to a reduced lifetime of the battery of the fob. Thus, there is a tradeoff between the gain of LF receiver 24 of fob 14 (i.e., the battery life of the fob) and the size of normal communication range 28. The gain of LF receiver 24 of fob 14 is therefore set at a normal gain level which corresponds to normal communication range 28.

The present disclosure provides a method for extending normal communication range 28 to an extended (i.e., larger) communication range 30 (shown in FIGS. 3A, 3B, and 3C) during the walkaway locking control function. The method extends the LF communication range as it is desired to have a longer communication range for the walkaway locking in order to not trip the locking action when the user with fob 14 is not sufficiently far enough away from vehicle 16.

The method includes changing the gain of LF receiver 24 of fob 14 from the normal gain level to a high gain level during the walkway locking control function. The high gain level of LF receiver 24 of fob 14 causes remote control system 10 to have extended communication range 30 in place of normal communication range 28. The gain level of LF receiver 24 of fob 14 is set to the high gain level during the walkway locking control function, but remains set at the normal gain level during other times. In this way, the method extends the LF communication range while minimizing impact on battery life of fob 14 (i.e., more battery power consumed just during the walkaway locking control function while less battery power consumed during other times—the time duration of walkaway locking control functions being relatively small compared to the time duration of the entire operation of the fob). Further, the method extends the LF communication range without impacting hardware of remote control system 10 (e.g., antenna size/placement not impacted).

Figure 3A:
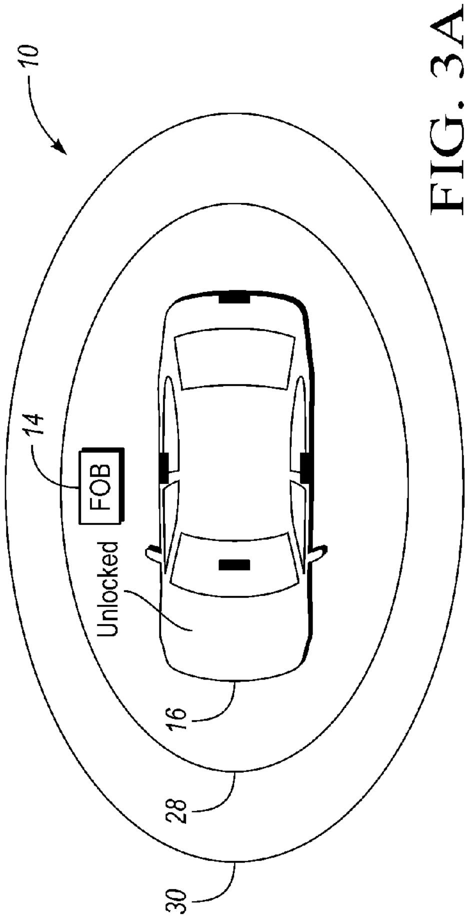
FIG. 3A illustrates a schematic of the fob located away from the vehicle at the first position within the normal communication range, the first position further being within an extended communication range of the remote control system.
Figure 3B:
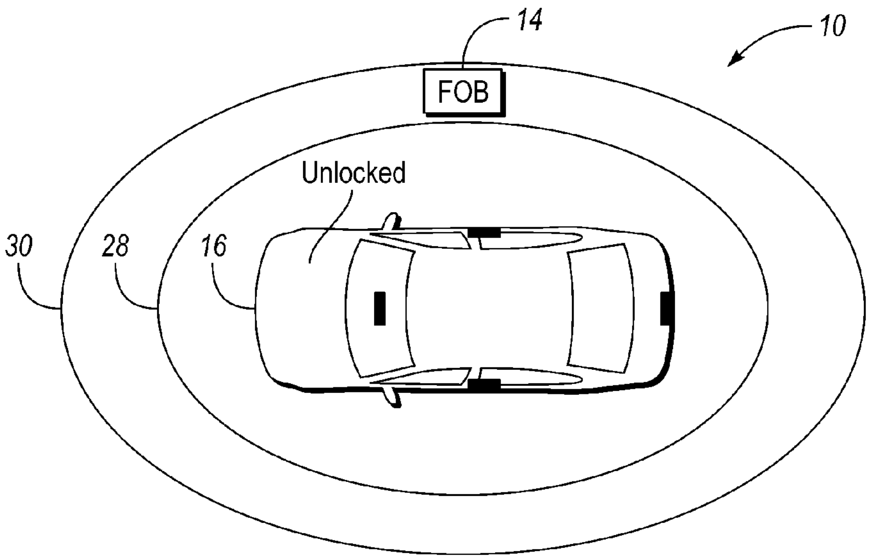
FIG. 3B illustrates a schematic of the fob located away from the vehicle at the second position outside of the normal communication range, the second position being within the extended communication range.
Figure 3C:
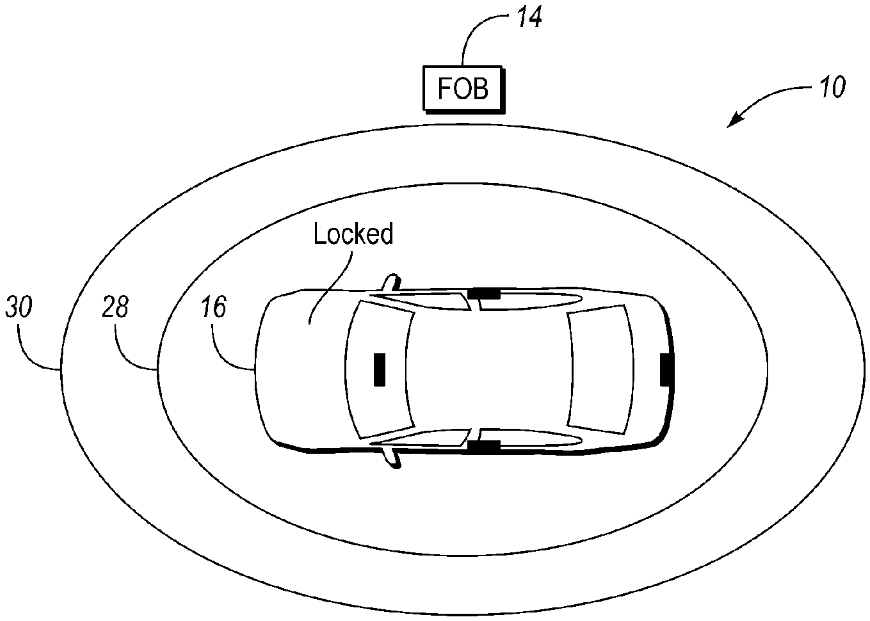
FIG. 3C illustrates a schematic of the fob located away from the vehicle at a third position, the third position being outside of both the normal communication range and the extended communication range.

Referring now to FIGS. 3A, 3B, and 3C, with continual reference to FIGS. 2A and 2B, the walkaway locking control function as modified with the method for extending normal communication range 28 to extended communication range 30 will be described in greater detail. FIG. 3A illustrates a schematic of fob 14 located away from vehicle 16 at the first position within both normal communication range 28 and extended communication range 30. FIG. 3B illustrates a schematic of fob 14 located away from vehicle 16 at the second position outside of normal communication range 28, but within extended communication range 30. FIG. 3C illustrates a schematic of fob 14 located away from vehicle 16 at a third position outside of both normal communication range 28 and extended communication range 30.

Extended communication range 30 instead of normal communication range 28 defines the boundary between the user with fob 14 being near or far from vehicle 16 for the walkaway locking control function. Fob 14 is considered to be near vehicle 16 when the fob is located within extended communication range 30. In this case, base station 12 does not lock vehicle 16 and the vehicle remains unlocked (the user with the fob having already exited the vehicle). For instance, base station 12 does not lock vehicle 16 while fob 14 is at the first position within both normal communication range 28 and extended communication range 30 as shown in FIG. 3A. Likewise, base station 12 does not lock vehicle 16 while fob 14 is at the second position outside of normal communication 28, but within extended communication range 30 as shown in FIG. 3B. Fob 14 is considered to be far from vehicle 16 when the fob is located outside of extended communication range 30. In this case, base station 12 locks vehicle 16 upon fob 14 being moved outside of extended communication range 30. For instance, base station 12 locks vehicle 16 while fob 14 is at the third position outside of both normal communication range 28 and extended communication range as shown in FIG. 3C.

Figure 4A:
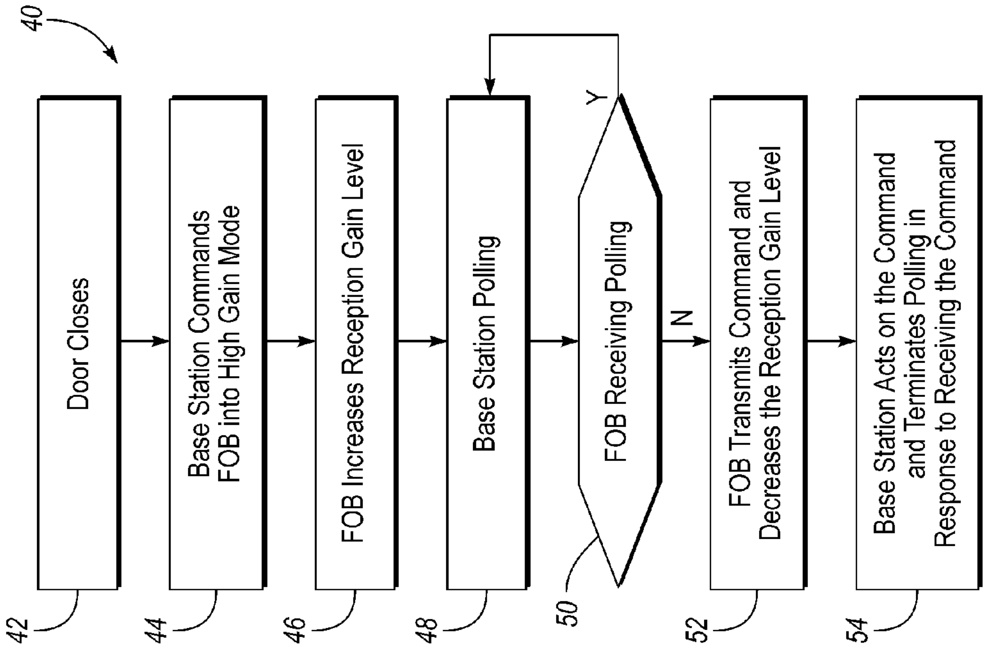
FIG. 4A illustrates a flowchart depicting operation for extending the normal communication range to the extended communication range during a walkaway locking control function.

Referring now to FIG. 4A, with continual reference to FIGS. 3A, 3B, and 3C, a flowchart 40 depicting operation of the walkaway locking control function as modified with normal communication range 28 being extended to extended communication range 30 is shown. The operation includes base station 12 detecting a vehicle door closing indicative of the user exiting vehicle 16 as indicated in block 42. Base station 12 and fob 14 then exchange search related communication for the base station to confirm that the fob is located outside of vehicle 16.

If base station 12 detects fob 14 being outside of vehicle, then the operation continues by the base station transmitting a high gain level command to the fob as indicated in block 44. Fob 14 responds to receiving the high gain level command by changing the gain of LF receiver 24 of the fob from the normal gain level to the high gain level as indicated in block 46. Remote control system 10 has extended communication range 30 instead of normal communication range 28 while the gain level of LF receiver 24 of fob 14 is at the high gain level.

After or before base station 12 transmits the high gain level command, LF transmitter 18 of base station 12 starts transmitting LF polling signals as indicated in block 48. LF receiver 24 of fob 14 receives the LF polling signals while the fob is within extended communication range 30 as indicated in block 50 (this situation is the subject of FIGS. 3A and 3B). As LF receiver 24 of fob 14 receives the LF polling signals the fob does not yet transmit the lock command to base station 12. Accordingly, LF transmitter 18 of base station 12 continues on transmitting the LF polling signals as indicated in block 48.

Once fob 14 moves outside of extended communication range 30, LF receiver 24 of the fob is unable to receive the LF polling signals (this situation is the subject of FIG. 3C). Thus, fob 14 stops detecting the LF polling signals once the fob moves outside of extended communication range 30. Fob 14 transmits the lock command (via its UHF transmitter 26) as soon as LF receiver 24 of the fob stops receiving the LF polling signals as indicated in block 52. Accordingly, fob 14 transmits the lock command upon the fob being moved outside of extended communication range 30. Fob 14 further changes the gain level of LF receiver 24 of the fob from the high gain level back to the normal gain level and goes into the standby mode after transmitting the lock command as indicated in block 52. Base station 12 responds to receiving the lock command (via its UHF receiver 20) by locking vehicle 16 and terminating transmission of the LF polling signals as indicated in block 54.

Figure 4B:
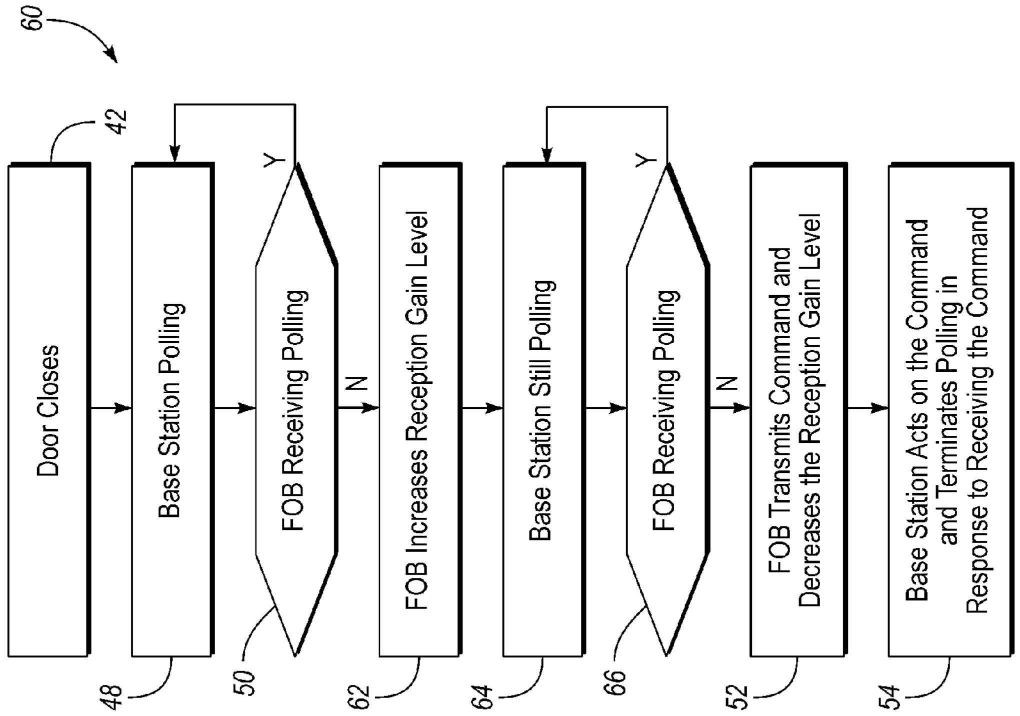
FIG. 4B illustrates a flowchart depicting another operation for extending the normal communication range to the extended communication range during the walkaway locking control function.

Referring now to FIG. 4B, with continual reference to FIG. 4A, a flowchart 60 depicting another operation of the walkaway locking control function as modified with normal communication range 28 being extended to extended communication range 30 is shown. The operation according to flowchart 60 includes some of the same steps of the operation according to flowchart 40 shown in FIG. 4A. These same steps depicted in flowchart 60 include the same reference numerals as flowchart chart 40.

The operation according to flowchart 60 includes fob 14 changing the gain of LF receiver 24 of the fob from the normal gain level to the high gain level upon the fob not receiving the LF polling signals from base station 12 (i.e., upon the fob moving out of normal communication range 28). As such, the operation of flowchart 60 does not involve the steps of base station 12 transmitting the high gain level command to fob 14 pursuant to block 44 of FIG. 4A and the fob responding by changing the normal gain level to the high gain level pursuant to block 46 of FIG. 4A.

In detail, the operation according to flowchart 60 includes LF transmitter 18 of base station 12 commencing transmission of LF polling signals as indicated in block 48 after the base station detects the vehicle door closing and confirms that the fob is located outside of vehicle 16. At this time, the gain level of LF receiver 24 of fob 14 is at the normal gain level. Therefore, remote control system 10 has normal communication range 28. LF receiver 24 of fob 14 receives the LF polling signals while the fob is within normal communication range 28 as indicated in block 50 (this situation is the subject of FIG. 3A). As LF receiver 24 of fob 14 receives the LF polling signals the fob does not yet transmit the lock command to base station 12. Accordingly, LF transmitter 18 of base station 12 continues on transmitting the LF polling signals as indicated in block 48.

Once fob 14 moves outside of normal communication range 28, LF receiver 24 of the fob is unable to receive the LF polling signals. Thus, fob 14 stops detecting the LF polling signals once the fob moves outside of normal communication range 28. However, fob 14 does not yet transmit the lock command to base station 12. Instead, fob 14 changes the gain level of LF receiver 24 of the fob from the normal gain level to the high gain level as indicated in block 62. The high gain level setting causes remote control system 10 to have extended communication range 30 instead of normal communication range 28. LF receiver 24 of fob 14 will continue on receiving the LF polling signals while the fob is within extended communication range 30 (this situation is the subject of FIG. 3B). As LF receiver 24 of fob 14 receives the LF polling signals the fob does not yet transmit the lock command to base station 12. Accordingly, LF transmitter 18 of base station 12 continues on transmitting the LF polling signals as indicated in block 64 and LF receiver 24 of fob 14 continues on receiving the LF polling signals while the fob is within extended communication range 30 as indicated in block 66.

Once fob 14 moves outside of extended communication range 30, LF receiver 24 of the fob is unable to receive the LF polling signals (this situation is the subject of FIG. 3C). Thus, fob 14 stops detecting the LF polling signals once the fob moves outside of extended communication range 30. Fob 14 transmits the lock command as soon as LF receiver 24 of the fob stops receiving the LF polling signals as indicated in block 52. Accordingly, fob 14 transmits the lock command upon the fob being moved outside of extended communication range 30. Fob 14 further changes the gain level of LF receiver 24 of the fob from the high gain level back to the normal gain level and goes into the standby mode after transmitting the lock command. Base station 12 responds to receiving the lock command by locking vehicle 16 and terminating transmission of the LF polling signals as indicated in block 54.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:

transmitting a gain command signal from the base station;

in response to the controller receiving the gain command signal, increasing a reception gain level of a portable controller to a high gain level providing an extended communication range in which the controller receives polling signals from a base station, the controller being unable to receive the polling signals while the controller is outside of the extended communication range; and upon the controller not receiving the polling signals, transmitting a command signal from the controller for receipt by the base station and decreasing the reception gain level back to a normal gain level.

2. The method of claim 1 wherein:

the command signal is a lock command signal for a target device.

3. The method of claim 2 further comprising:

locking the target device by the base station in response to the base station receiving the lock command signal.

4. The method of claim 1 wherein:

the reception gain level of the controller is increased to the high gain level and decreased back to the normal gain level during a walkaway locking remote control function.

5. The method of claim 1 wherein:

the polling signals are low-frequency (LF) polling signals and the command signal is an ultra-high frequency (UHF) signal.

6. The method of claim 5 wherein:

the extended communication range is a LF communication range.

7. A method comprising:

setting a reception gain level of a controller to a normal gain level providing a normal communication range in which the controller receives polling signals from a base station, the controller at the normal gain level being unable to receive the polling signals upon the controller being moved outside of the normal communication range;

upon the controller at the normal gain level not receiving the polling signals, increasing the reception gain level of the controller to a high gain level in which the controller receives the polling signals from the base station, the controller at the high gain level being unable to receive the polling signals from the base station upon the controller being moved outside of an extended communication range; and upon the controller at the high gain level not receiving the polling signals, transmitting a command signal from the controller for receipt by the base station and decreasing the reception gain level back to the normal gain level.

8. The method of claim 7 wherein:

the command signal is a lock command signal for a target device.

9. The method of claim 7 wherein:

the reception gain level of the controller is increased to the high gain level and decreased back to the normal gain level during a walkaway locking remote control function.

10. A method for a remote control system including a base station at a target device and a portable controller, the method comprising:

detecting, by the base station, the controller being moved out from the target device;

transmitting a gain command signal and polling signals from the base station in response to the controller being moved out from the target device;

in response to the controller receiving the gain command signal, increasing a reception gain level of the controller from a normal gain level providing a normal communication range for the controller to receive the polling signals to a high gain level providing an extended communication range for the controller to receive the polling signals, the controller being unable to receive the polling signals while the controller has the normal gain level and is outside of the normal communication range, the controller being unable to receive the polling signals while the controller has the high gain level and is outside of the extended communication range;

transmitting a lock command signal from the controller and decreasing the reception gain level from the high gain level back to the normal gain level upon the controller not receiving the polling signals; and locking, by the base station, the target device in response to the base station receiving the lock command signal.

11. The method of claim 10 wherein:

the target device is a vehicle.

12. The method of claim 10 wherein:

the reception gain level of the controller is increased to the high gain level and decreased back to the normal gain level during a walkaway locking remote control function.

13. The method of claim 10 wherein:

the polling signals are low-frequency (LF) polling signals and the lock command signal is an ultra-high frequency (UHF) signal.

14. A remote control system comprising:

a base station at a target device;

a portable controller;

wherein the base station is configured to detect the controller being moved out from the target device and to transmit a gain command signal and polling signals in response to the controller being moved out from the target device;

wherein the controller is configured to, in response to receiving the gain command signal, increase a reception gain level of the controller from a normal gain level providing a normal communication range for the controller to receive the polling signals to a high gain level providing an extended communication range for the controller to receive the polling signals, the controller being unable to receive the polling signals while the controller has the normal gain level and is outside of the normal communication range, the controller being unable to receive the polling signals while the controller has the high gain level and is outside of the extended communication range;

wherein the controller is further configured to transmit a lock command signal and decrease the reception gain level from the high gain level back to the normal gain level upon the controller not receiving the polling signals; and wherein the base station is configured to lock the target device in response to receiving the lock command signal.

15. The system of claim 14 wherein:

the target device is a vehicle.

16. The system of claim 14 wherein:

the reception gain level of the controller is increased to the high gain level and decreased back to the normal gain level during a walkaway locking remote control function.

17. The system of claim 14 wherein:

the polling signals are low-frequency (LF) polling signals and the lock command signal is an ultra-high frequency (UHF) signal.

* * * * *